United States Patent
Fleureau et al.

(10) Patent No.: US 11,025,955 B2
(45) Date of Patent: Jun. 1, 2021

(54) METHODS, DEVICES AND STREAM FOR ENCODING AND DECODING VOLUMETRIC VIDEO

(71) Applicant: InterDigital CE Patent Holdings, Paris (FR)

(72) Inventors: Julien Fleureau, Cesson-Sevigne (FR); Renaud Dore, Cesson-Sevigne (FR); Franck Thudor, Cesson-Sevigne (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/630,667

(22) PCT Filed: Jul. 12, 2018

(86) PCT No.: PCT/EP2018/069013
§ 371 (c)(1),
(2) Date: Jan. 13, 2020

(87) PCT Pub. No.: WO2019/012067
PCT Pub. Date: Jan. 17, 2019

(65) Prior Publication Data
US 2020/0314449 A1   Oct. 1, 2020

(30) Foreign Application Priority Data

Jul. 13, 2017 (EP) ................................. 17305936

(51) Int. Cl.
*H04N 19/00* (2014.01)
*H04N 19/597* (2014.01)
(Continued)

(52) U.S. Cl.
CPC .......... *H04N 19/597* (2014.11); *H04N 19/20* (2014.11); *H04N 19/85* (2014.11)

(58) Field of Classification Search
CPC ..................................................... H04N 19/00
See application file for complete search history.

(56) References Cited

U.S. PATENT DOCUMENTS

| 10,275,898 | B1 * | 4/2019 | Song | G06T 15/20 |
| 2017/0244948 | A1 * | 8/2017 | Pang | H04N 13/156 |
| 2017/0347120 | A1 * | 11/2017 | Chou | H04N 19/147 |

OTHER PUBLICATIONS

Kang et al., "VR signaling for MMT", International Organization for Standardization, ISO/IEC JTC1/SC29/WG11, Coding of Moving Pictures, ISO/IEC JTC1/SC29/WG11 MPEG2017/M40465, Hobart, Australia, Apr. 2017, 4 pages.
(Continued)

*Primary Examiner* — Maryam A Nasri
(74) *Attorney, Agent, or Firm* — Robert D. Shedd

(57) ABSTRACT

A sequence of point clouds is encoded as a video by an encoder and transmitted to a decoder which retrieves the sequence of point clouds. Visible points of a point cloud are iteratively projected on a projection map to determine a patch data item list. Image patches are generated and packed into a picture. Pictures and associated patch data item list are encoded in a stream. The decoding method decodes pictures and associated patch data item lists. Pixels of image patches comprised in pictures are un-projected according to data stored in associated patches. The methods have the advantage of encoding every point of point clouds in a manner avoiding artifacts and allowing decoding at video frame rate.

14 Claims, 7 Drawing Sheets

Figure 1:
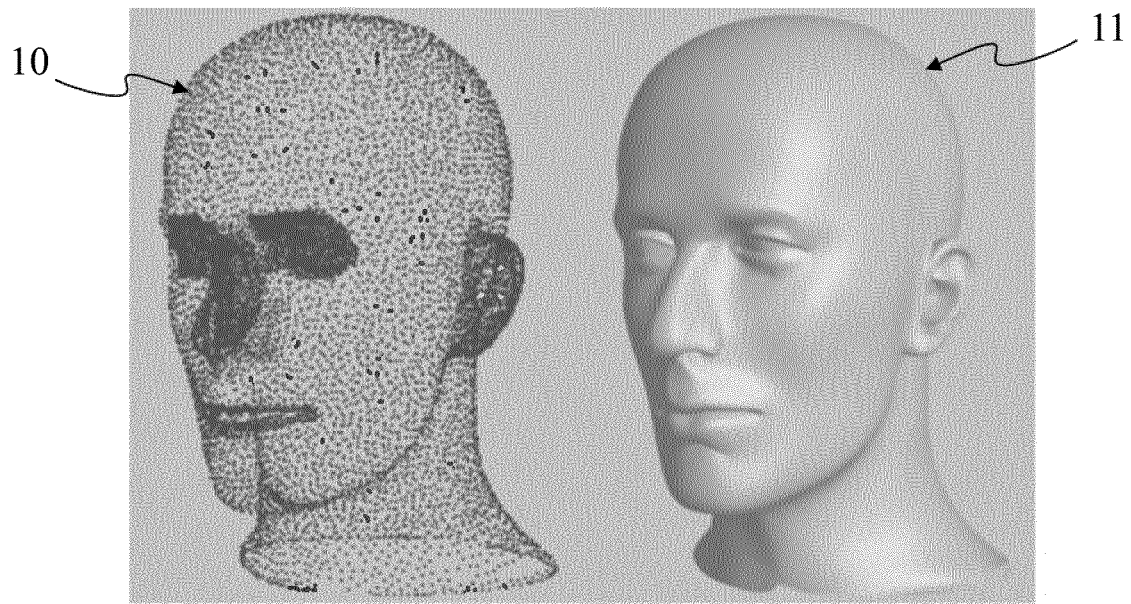

(51) Int. Cl.
　　　*H04N 19/20*　　　(2014.01)
　　　*H04N 19/85*　　　(2014.01)

(56) References Cited

OTHER PUBLICATIONS

Choi et al., "OMAF Pack-VE: Multi-patch based Packing for omnidirectional video", International Organization for Standardization, ISO/IEC JTC1/SC29/WG11, Coding of Moving Pictures, ISO/IEC JTC1/SC29/WG11 MPEG2017/M39841, Geneva, Switzerland, Jan. 2017, 6 pages.

Ochotta et al., "Compression of Point-Based 3D Models by Shape-Adaptive Wavelet Coding of Multi-Height Fields", Proceedings of the First Eurographics Conference on Point-Based Graphics, Zurich, Switzerland, Jun. 2, 2004, pp. 103-112.

Ochotta et al., "Image-Based Surface Compression", Computer Graphics Forum, vol. 27, No. 6, Sep. 2008, pp. 1647-1663.

Oh et al., "SEI Message for Signaling of 360-degree Video Information", Joint Collaborative Team on Video Coding (JCT-VC) of ITU-T SG16 WP 3 and ISO/IEC JTC 1/SC 29/WG 11, Document JCTVC-Z0026, 26th Meeting, Geneva, Switzerland, Jan. 12, 2017, 6 pages.

Jylanski, J., "A Thousand Ways to Pack the Bin—A Practical Approach to Two-Dimensional Rectangle Bin Packing", retrieved from https://core.ac.uk/display/103387426, Feb. 27, 2010, 50 pages.

\* cited by examiner

METHODS, DEVICES AND STREAM FOR ENCODING AND DECODING VOLUMETRIC VIDEO

This application claims the benefit, under 35 U.S.C. § 365 of International Application PCT/EP2018/069013, filed Jul. 12, 2018, which was published in accordance with PCT Article 21(2) on Jan. 17, 2019, in English, and which claims the benefit of European Patent Application No. 17305936.1 filed Jul. 13, 2017.

1. TECHNICAL FIELD

The present disclosure relates to the domain of volumetric video content. The present disclosure is also understood in the context of the formatting of the data representative of the volumetric content, for example for an immersive rendering on end-user devices such as mobile devices or Head-Mounted Displays.

2. BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Immersive video, also called 360° flat video, allows the user to watch all around himself through rotations of his head around a still point of view. Rotations only allow a 3 Degrees of Freedom (3DoF) experience. Even if 3DoF video is sufficient for a first omnidirectional video experience, for example using a Head-Mounted Display device (HMD), 3DoF video may quickly become frustrating for the viewer who would expect more freedom, for example by experiencing parallax. In addition, 3DoF may also induce dizziness because of a user never only rotates his head but also translates his head in three directions, translations which are not reproduced in 3DoF video experiences.

Volumetric video (also known as 6 Degrees of Freedom (6DoF) video) is an alternative to 3DoF video. When watching a 6DoF video, in addition to rotations, the user can also translate his head inside the watched content and experience parallax. Such videos considerably increase the feeling of immersion and the perception of the scene depth but also prevent from dizziness by providing consistent visual feedback during head translations. The associated content is basically created by the means of dedicated sensors allowing the simultaneous recording of color and depth of the scene of interest. The use of rig of color cameras combined with photogrammetry techniques is a common way to do this recording.

While 3DoF videos comprise a sequence of images resulting from the un-mapping of texture images (e.g. spherical images encoded according to latitude/longitude projection or equirectangular projection), 6DoF video frames embed information from several points of views. They can be viewed as a temporal series of point clouds resulting from a three-dimension capture. Two kinds of volumetric videos may be considered depending on the viewing conditions. A first one (i.e. complete 6DoF) allows a complete free navigation inside the video content whereas a second one (aka. 3DoF+) restricts the user viewing space to a limited volume, allowing limited translation of the head and parallax experience. This second context is a natural compromise between free navigation and passive viewing conditions of a seated audience member.

Encoding point clouds in a sequence of frames (i.e. a video content) in a manner that is in line with standard video pipeline (e.g. MPEG), taking advantage of compression and transport standards, and that allows a decoding at a video frame rate (i.e. at least 24 images/point clouds per second) is a challenge. The present principles present methods, devices and stream to address these coding and decoding technical problems.

3. SUMMARY

References in the specification to "one embodiment", "an embodiment", "an example embodiment", "a particular embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure relates to a method of encoding a point cloud into a stream. The method comprises:
  determining, for the point cloud, a list of patch data items. A patch data item comprises an angular range, a depth range and information identifying an area within a picture. A patch data item being paired with a part of the point cloud;
  generating a picture comprising a set of image patches. Each image patch is obtained by projecting a part of the point cloud on the picture according to a data item of the list; and
  encoding, in the stream, the picture and the list of data items.

The operation of determining, for the point cloud, a list of data items comprises:
  a. projecting a part of the point cloud on a projection map, this part comprising points of the point cloud visible from a point of view;
  b. determining patch data items of the list by clustering adjacent pixels of the projection map according to depth information and pairing projected points of the cluster with corresponding patch data item; and
  c. removing the part of the point cloud from the point cloud;
  d. reiterating a, b and c until the point cloud is empty or the patch data item list is full.

According to a particular characteristic, the point cloud comprises points of a group of point clouds of a sequence of point clouds. A unique patch data item list is determined for the group of pictures, each picture of the group being generated for a point cloud of the group of point clouds. The group of pictures is encoded in the stream in association with the unique patch data item list.

According to a particular characteristic, pixels of an image patch store a depth value. The depth value is determined according to depth range of the patch data item associated with the image patch.

The present disclosure also relates to a device for encoding a point cloud into a stream. The device comprises a memory associated with at least one processor configured to:
  determine, for the point cloud, a list of patch data items, a patch data item comprising an angular range, a depth range and information identifying an area within a picture, a patch data item being paired with a part of the point cloud;
  generate a picture comprising a set of image patches, each image patch being obtained by projecting a part of the point cloud on the picture according to a data item of the list; and
  encode, in the stream, the picture and the list of data items.

The present disclosure also relates to a method of decoding a point cloud from a stream. The method comprises:
  decoding a picture and a patch data item list from the stream, a patch data item comprising an angular range, a depth range and information identifying an area within a picture;
  unpacking image patches from the picture and associating each image patch with a patch data item of the patch data item list; and
  decoding points of the point cloud by un-projecting pixels of each unpacked image patch according to the associated patch data item.

The present disclosure also relates to device for decoding a point cloud from a stream. The device comprises a memory associated with at least a processor configured to:
  decode a picture and a patch data item list from the stream, a patch data item comprising an angular range, a depth range and information identifying an area within a picture;
  unpacking image patches from the picture and associating each image patch with a patch data item of the patch data item list; and
  decoding points of the point cloud by un-projecting, from the point of view, pixels of each unpacked image patch according to the associated patch data item.

The present disclosure also relates to a stream carrying data representative of at least a point cloud. The stream comprises at least one picture. The pictures comprise image patches and data comprising a patch data item list. A patch data item is associated with an image patch of at least one picture, a patch data item comprising an angular range, a depth range and information identifying an area within the at least one picture.

According to a particular characteristic, the stream further carries data representative of a background omnidirectional video.

4. LIST OF FIGURES

Figure 2:
Figure 3:
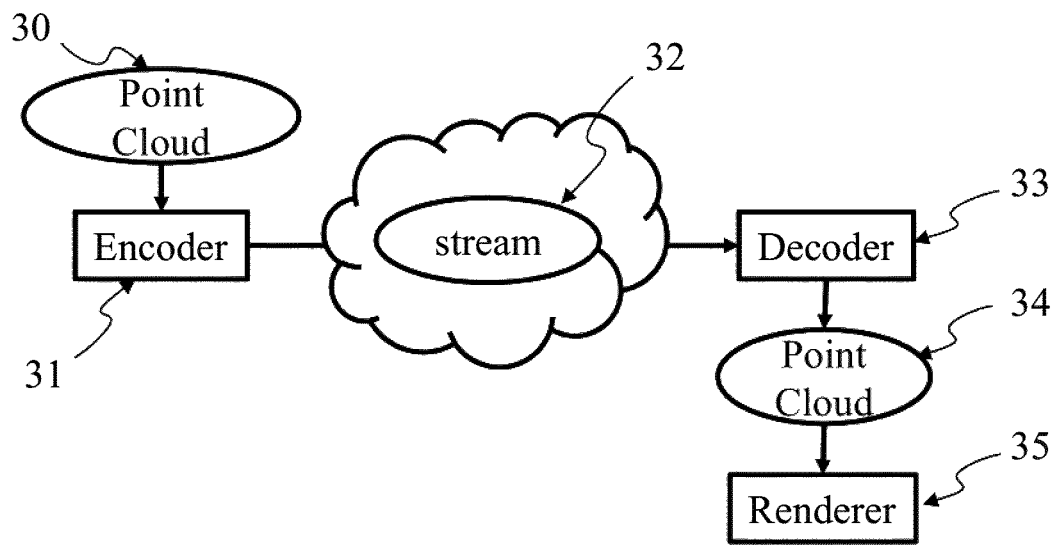
Figure 4:
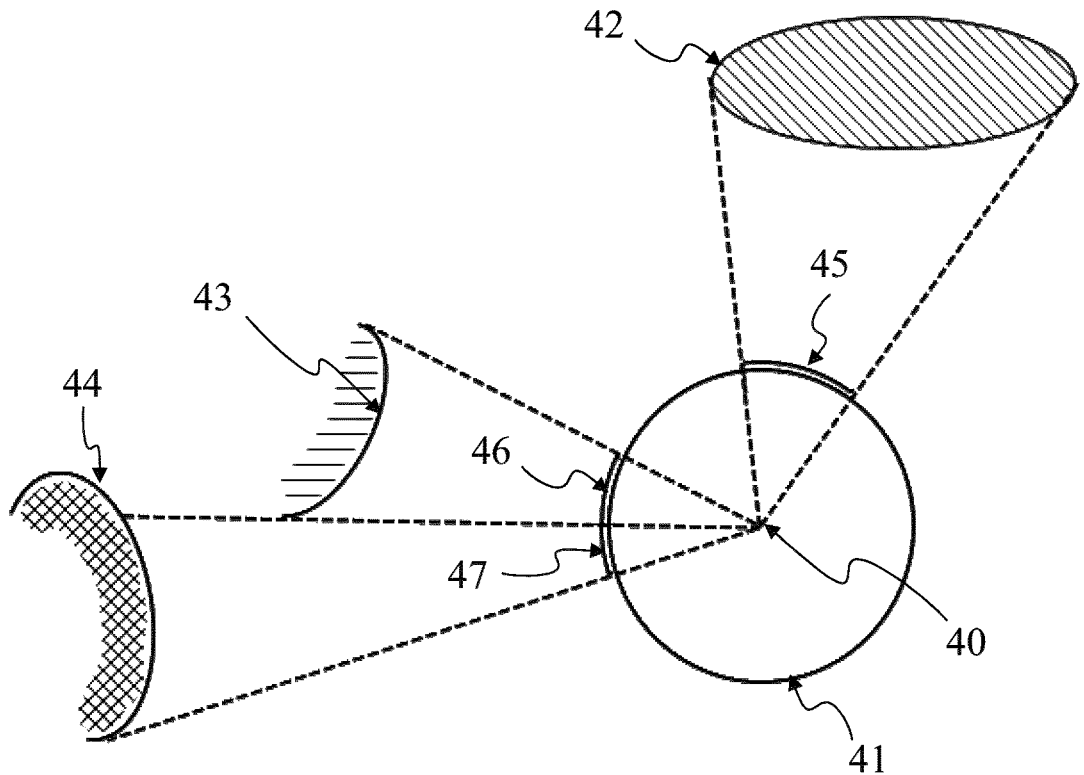
Figure 5:
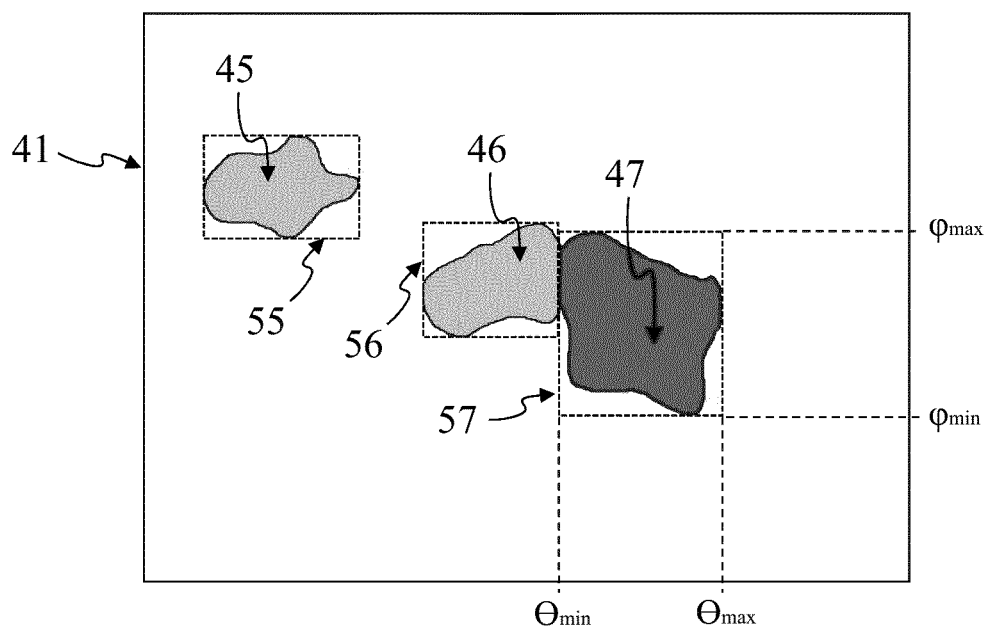
Figure 6:
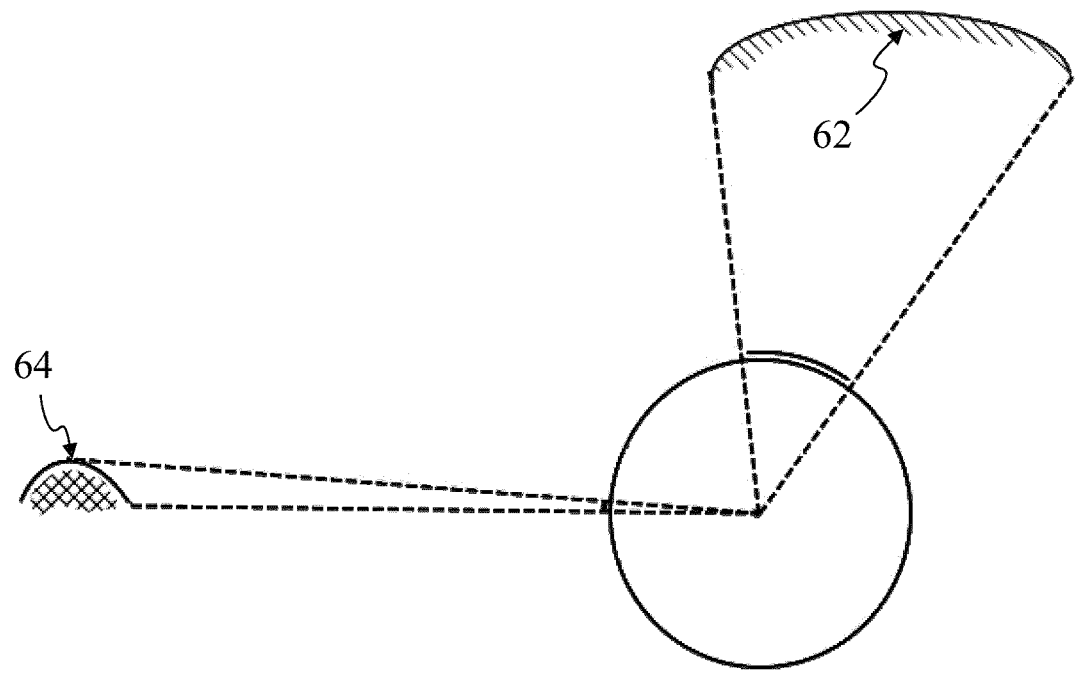
Figure 7:
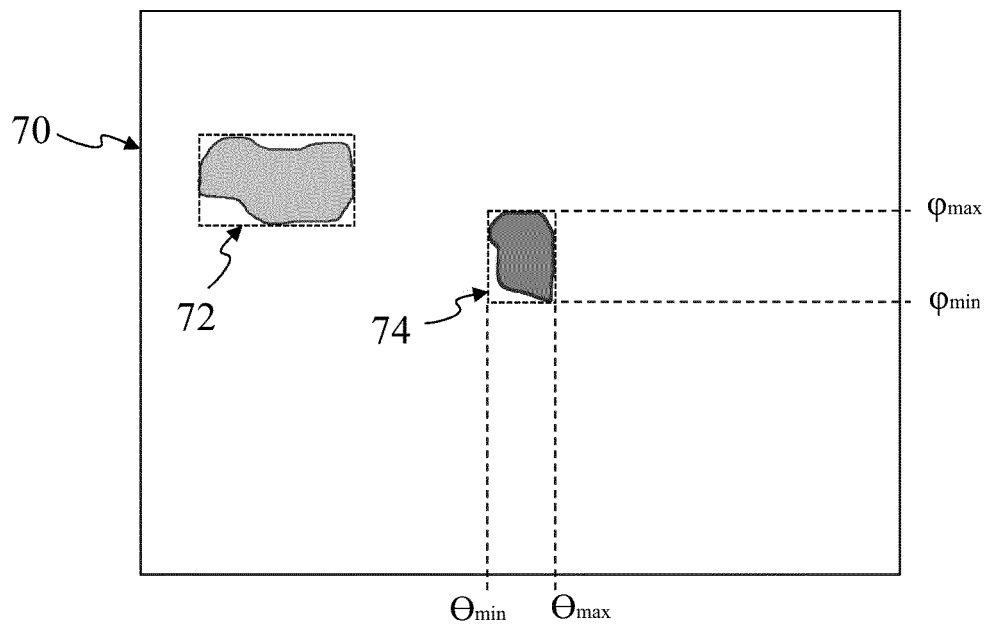
Figure 8:
Figure 9:
Figure 10:
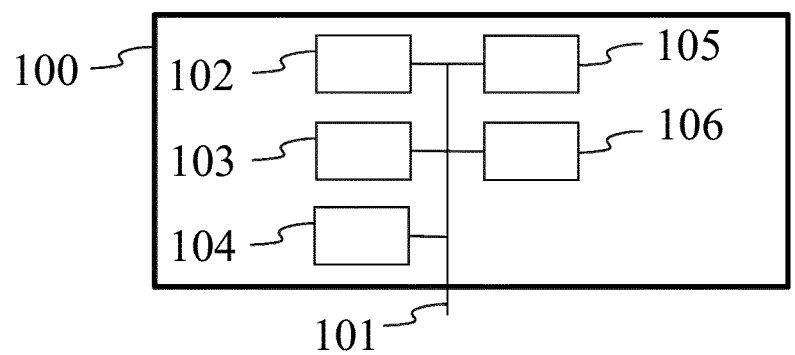
Figure 11:
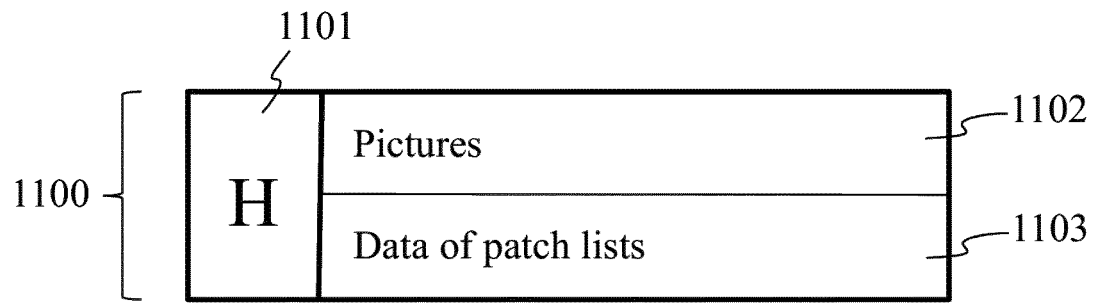
Figure 12:
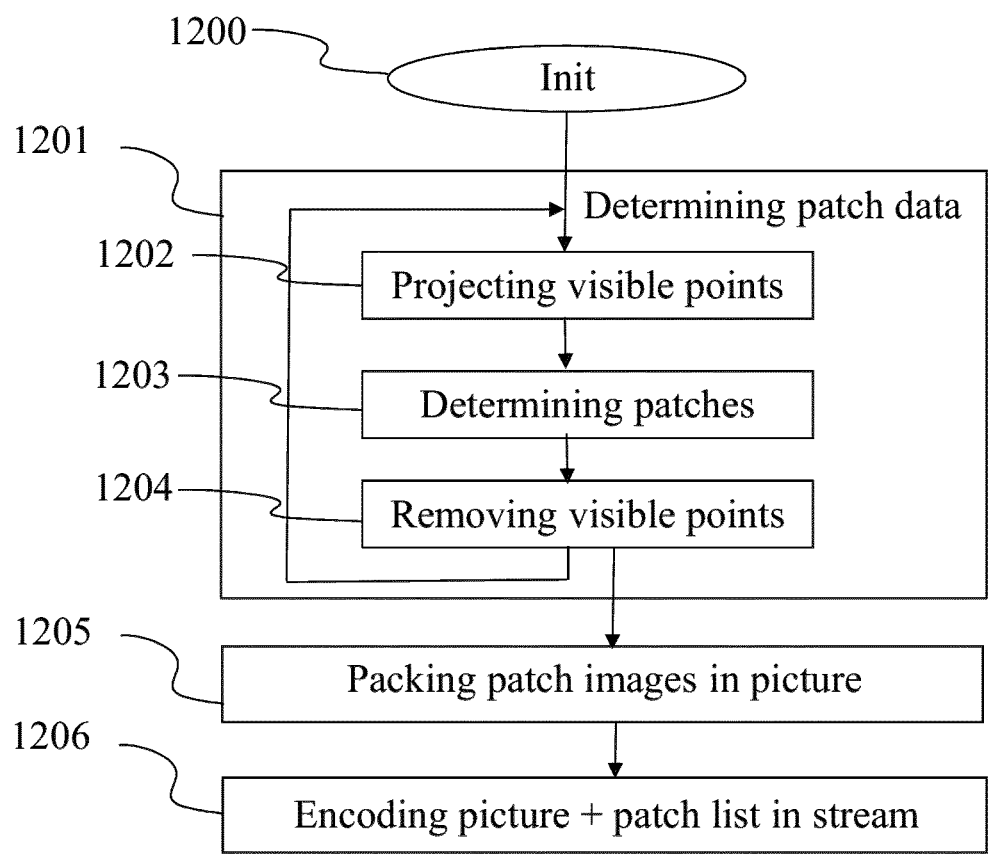
Figure 13:
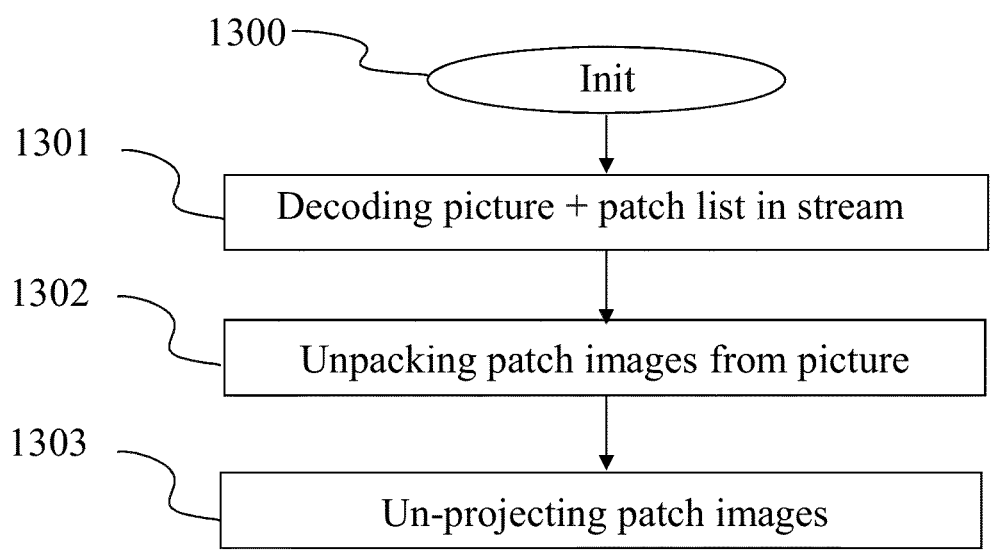

The present disclosure will be better understood, and other specific features and advantages will emerge upon reading the following description, the description making reference to the annexed drawings wherein:
  FIG. 1 shows a point cloud 10 and a surface 11 built over the point cloud, according to a non-restrictive embodiment of the present principles;
  FIG. 2 shows an image 20 representing a three-dimension scene comprising a surface representation of several objects captured as a point cloud as illustrated in FIG. 1, according to a non-restrictive embodiment of the present principles;
  FIG. 3 illustrates an example of the encoding, transmission and decoding of a sequence of point clouds, for example the point clouds of FIG. 2, according to a non-restrictive embodiment of the present principles;
  FIG. 4 illustrates a first iteration of the encoding method according to a point of view, according to a non-restrictive embodiment of the present principles;
  FIG. 5 shows a diagrammatical example of projection map 41 of FIG. 4, according to a non-restrictive embodiment of the present principles;
  FIG. 6 illustrates a second iteration of the encoding method according to the point of view of FIG. 5, according to a non-restrictive embodiment of the present principles;
  FIG. 7 diagrammatical shows the projection map resulting of the projection of the visible points of the remaining point cloud of FIG. 6, according to a non-restrictive embodiment of the present principles;
  FIG. 8 shows a picture comprising image patches encoding depth information of the point cloud of the scene of FIG. 2, according to a non-restrictive embodiment of the present principles;
  FIG. 9 shows a picture comprising color image patches of the patch data item list determined for the point cloud of the scene illustrated on FIG. 2, according to a non-restrictive embodiment of the present principles;
  FIG. 10 shows an example architecture of a device which may be configured to implement a method described in relation with FIGS. 12 and/or 13, according to a non-restrictive embodiment of the present principles;
  FIG. 11 shows an example of an embodiment of the syntax of a stream when the data are transmitted over a packet-based transmission protocol, according to a non-restrictive embodiment of the present principles;
  FIG. 12 illustrates a method for encoding a point cloud in a stream, in a device 10 of FIG. 10 configured to be a device 31 of FIG. 3, according to a non-restrictive embodiment of the present principles;
  FIG. 13 illustrates a method for decoding a point cloud from a stream, in a device of FIG. 10 configured to be a device 33 of FIG. 3, according to a non-restrictive embodiment of the present principles.

5. DETAILED DESCRIPTION OF EMBODIMENTS

The subject matter is now described with reference to the drawings, wherein like reference numerals are used to refer to like elements throughout. In the following description, for purposes of explanation, numerous specific details are set forth in order to provide a thorough understanding of the subject matter. It can be evident, however, that subject matter embodiments can be practiced without these specific details.

The present description illustrates the principles of the present disclosure. It will thus be appreciated that those skilled in the art will be able to devise various arrangements that, although not explicitly described or shown herein, embody the principles of the disclosure.

The present principles will be described in reference to a particular embodiment of a method of encoding a sequence of point clouds in a stream according to a point of view and a method of decoding the sequence of point clouds from the stream according to a point of view.

The encoding method obtains a sequence of point clouds as entry. In a first operation, points of a point cloud of the sequence are iteratively projected on a projection map to determine patches. Depth (i.e. the distance between a point and the point of view) is stored in the projection map pixels. In a variant, color information of the projected points is also stored in the projection map. A patch corresponds to a part of the projected points which define an area of adjacent pixels in the projection map and which are depth consistent. The part is defined by the angular range the corresponding projected points occupy in the space from the point of view. For an iteration, only points visible from the point of view are projected. Patches are clustered in the projection map according to their connectivity and depth and added to a patch data item list. Projected points are removed from the point cloud and a new iteration is performed with the modified point cloud until the point cloud is empty or until the patch data item list is full. In a second operation, when the patch data item list is completed, patches are arranged in a picture with a given angular resolution (e.g. 3 seconds per pixel or 5 seconds per pixel) according to the size that the projection of points of the patch will occupy in the picture. The arrangement consists in reserving an area in the picture for projecting (depth and color) the points associated with the patch. The size of the reserved area depends on the picture angular resolution and on the angular range of the patch. The location of the areas in the frame is optimized to cover the picture's frame without overlapping. In a third operation, points of the point cloud are then projected on the picture according to the patch that they are associated with in the related area. The obtained picture is encoded in the stream in association with data representative of the patch data item list. These data comprise the angular range of the patch, the depth range of the patch (i.e. the minimal and maximal depth of points of the patch) and the location of the patch area within the picture. So, the picture comprises image patches encoding points depth information. In a variant, the picture or a second picture also encodes points color information. In another embodiment, a group of point clouds of the sequence, gathered as a unique point cloud, is used as the entry point cloud of the encoding method. The patch data item list obtained by the iterative operation has the advantage of being temporally consistent. A unique set of data representative of the patch data item list is encoded in the stream and associated with the group of pictures (GoP), a picture being generated for each point cloud of the group. The generated stream has the advantage to be in line with standard video compression and transport pipelines.

The decoding method obtains the stream as entry. Pictures and associated data representative of a patch data item list are decoded from the stream. A picture is associated with a patch data item list. A patch data item list may be associated with a group of pictures (GoP). The sequence of point clouds is retrieved from the sequence of pictures, a point cloud of the sequence being obtained by un-projecting pixels of image patches comprised in a picture according to associated patch data. The location of a point is determined according to the depth information stored in the pixel, the coordinates of the pixel in the image patch and the patch data. The angle relatively to the point of view and the distance between the point and the point of view are determined and the point is placed in the point cloud. In a variant, the picture or a second picture comprises color information which is attributed to the un-projected point. The decoding method has the advantage to be straightforward and can be performed at least at a video frame rate by a processor.

FIG. 1 shows a point cloud 10 and a surface 11 built over the point cloud. The point cloud 10 corresponds to a large collection of points representing the external surface or the external shape of an object or a group of objects. A point cloud may be seen as a vector based structure, wherein each point has its coordinates. For instance, a vector may be defined by three-dimensional coordinates XYZ in a frame of reference centered on an origin point. In another example, vectors are defined by radial coordinates (θ,φ,d) where (θ,φ) represents a three-dimension direction relative to a point of view and d the distance (also called 'depth') between the point of view and the point. A point may also have a color component that may be expressed in any color space, for example RGB (Red, Green and Blue) or YUV (Y being the luma component and UV two chrominance components). A surface 11 may be defined from the point cloud. The surface may be obtained according to several methods. For instance, points may be "splatted". Size of points is increased up to overlap neighbour to neighbour. These splats are represented as disks whose components (e.g. color) vary diametrically in normal (e.g. Gaussian) manner. Flat disks form a surface that is smoothed. In a variant, a triangulation may be performed on the points and the surface defined by a smoothed mesh based on the triangulation. The surface 11 may be computed by a graphic processor. It is used to determine visibility of points from a point of view. In the example of FIG. 1, for example, some points of the neck behind the chin, visible on the point cloud representation 10 are not visible on the surface representation 11 because the surface fills the space gap between points. With a surface representation, it is possible to determine whether a point of the point cloud is visible or not from a point of view.

FIG. 2 shows an image 20 representing a three-dimension scene comprising a surface representation of several objects captured as a point cloud. The image 20 is generated from a point of view different of the acquisition point of view. For example, the character at the right of the image 20 is not complete, points of his left arm and his back are not available (e.g. they have not been captured) to fulfill the surface representation. The scene represented on the image 20 may be split in two parts. A first part comprising objects that can be encoded in a 3DoF video without degrading the viewing experience may be encoded in a "background" 3DoF video stream. In FIG. 2, the background part comprises the floor and the walls of the scene. A foreground part comprises objects for which a 3DoF+ viewing experience is wanted. In the example of FIG. 2, the foreground part corresponds to the characters and to the statues.

FIG. 3 illustrates an example of the encoding, transmission and decoding of a sequence of point clouds. A sequence of at least one point cloud 30 is encoded in a stream 32 by an encoder 31 according to the principles of the present encoding method. A decoder 33 obtains stream 32 from a source. For example, the source belongs to a set comprising:

- a local memory, e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

Decoder 33 decodes a sequence of point clouds 34 from stream 32 according to the decoding method. According to the present principles, sequence of point clouds 34 is as similar to sequence of point clouds 30 as possible. Sequence of point clouds 34 may be obtained from a source by a rendered 35. Renderer 35 computes images to be displayed for a 3DoF+ video viewing experience.

FIG. 4 illustrates a first iteration of the encoding method according to a point of view 40. In example of FIG. 4, the point cloud comprises three objects 42, 43 and 44. Points of object 42 form a surface with a front side and a back side according to point of view 40. Backside points of object 42 are not visible from point of view 40. Points of objects 43 and 44 form surfaces with a front side only according to the point of view 40. Points of object 43 are visible from point of view 40 and only a part of the points of object 44 are visible from the point of view because of the occultation by the surface of object 43. In a first iteration of the encoding method, points of the point cloud visible from the point of view are projected on a projection map 41 according to a projection method. On the example of FIG. 4, the projection method is a spherical projection, for example a latitude/longitude projection or an equirectangular projection (aka. ERP), so the projection map is represented as a sphere on FIG. 4. In a variant, the projection method is a cubical projection method, a pyramid projection method or any projection method centered on a point of view. Points of the frontside of object 42 are projected in an area 45 of the projection map. Backside points of object 42 are not project as they are not visible from view point 40. Every point of object 43 is visible from point of view 40. They are projected according to the projection method on area 46 of projection map 41. Only a part of points of object 44 is visible from point of view 40. Visible points of object 44 are projected on area 47 of projection map 41.

FIG. 5 shows a diagrammatical example of projection map 41 of FIG. 4. Pixels of area 45 store the depth information relative to visible points of visible points of object 42; pixels of area 46 store the depth information relative to visible points of visible points of object 43; and pixels of area 47 store the depth information relative to visible points of visible points of object 44. A pixel clustering operation is performed to cluster adjacent pixels of projection map 41 according to depth information. Pixels 45 constitute a adjacent cluster which may be delimited by a rectangle 55. Pixels 46 and 47 constitute a adjacent area of projection map 41. Pixels of area 46 and area 47 however differ on the depth value they store. Pixels 46 have a depth value notably smaller than the depth value of pixels 47. According to the present principles of the encoding method, clusters are determined according to their connection and their depth value. As there is a gap between pixels 46 and pixels 47, they are grouped in separate clusters. These two clusters may be represented as rectangles 56 and 57. High frequency area between the two areas may be absorbed by the clustering operation and rectangles 56 and 57 may lightly overlap. Rectangle areas defined by the clustering operation are stored in memory as patch data items. For example, patch data for rectangle 57 comprise the angular range $([\theta_{min}, \theta_{max}],[\varphi_{min}, \varphi_{max}])$ of the visible points of object 44 according to point of view 40; $\theta_{min}$ being the leftmost value of radial coordinates of points of the patch according to the point of view, $\theta_{max}$ being the rightmost, $\varphi_{min}$ being the downmost and $\varphi_{max}$ being the upmost. The depth range $[\rho_{min},\rho_{max}]$ of the pixel area is also registered in the patch data. This component of patches is useful for encoding to increase dynamics of the byte range reserved for depth encoding. In a variant, clustering operation provide ellipsoid areas and patches comprise data representative of an ellipsoid area. Patches are added to a patch data item list associated with the point cloud. At this step, points of the point cloud visible from the point of view have been projection on the projection map and are removed from the point cloud.

FIG. 6 illustrates a second iteration of the encoding method according to point of view 40. At this step, already projected points have been removed from the point cloud. From points of the object, points 62 forming the back side of object 42 remain. Every point of object 43 have been remove from the point cloud as already projected and points 64 of object 44 remain to be projected. The projection of visible points as described in reference to FIG. 4 is iterated.

FIG. 7 diagrammatical shows the projection map resulting of the projection of the visible points of the remaining point cloud of FIG. 6. Rectangle 72 delimits a cluster corresponding to the projection of points 62. Rectangle 74 delimits a cluster corresponding to the projection of the visible points of the set of points 64. New patches are determined, two in the example of FIG. 7, each patch comprising an angular range $([\theta_{min}, \theta_{max}],[\varphi_{min}, \varphi_{max}])$ and a depth range $[\rho_{min}, \rho_{max}]$. Projected points are removed from the point cloud. After this iteration, the point cloud comprises only a part of points 64. A third iteration of the peeling operation is performed as described in reference to FIGS. 4 to 7.

The peeling operation aims at determining the patch data item list to which each point of the point cloud is going to be associated. This operation may be split into three steps. At each iteration:

i. The part of the point cloud not already processed called "active set" is projected on a low-resolution projection map which origin is set at the decided viewing point. In the example of FIGS. 4 to 7, the chosen projection method is an equirectangular projection. In variants, the projection method maybe another spherical projection method as a latitude/longitude projection or a cubical projection or a pyramid projection or any projection method centered on the point of view. The resolution of the projection map is low (e.g. 1 pixel per degree or 2 pixels per degree) in order to prevent the clustering operation from generating too little patches and thus produce an excessive number of patches.

ii. Then a clustering operation is performed in the projection map to identify homogeneous areas. In the examples of FIGS. 4 to 9, identified areas are rectangular. In variants, identified areas may have an ellipsoid shape. An area P covers a set of adjacent pixels of the projection map where a projection occurred and which is depth-consistent. The depth consistency check comes down to considering the distance Z between the viewing point and each projected point covered by P, and ensuring that the distance range of these pixels is not deeper than a threshold T. This threshold may depend on $Z_{max}$ (the maximum distance between the viewing point and the projected pixels covered by P), on the dynamic D of the depth stored in the generated picture by the further generating operation, and on perceptual properties. For example, the typical human visual acuity is about three minutes of arc. Determining the threshold T according to these criteria have several advantages. At one hand, an image patch in the picture generated in the further generating operation will cover a depth range consistent with the depth resolution of pixels of the generated picture (e.g. 10 bits or 12 bits) and, so, be robust to compression artifacts. On the other hand, the depth range is perceptually-driven by the 3DoF+ context. Indeed, human vision does not equally perceive distance for close or far points. As an example, the threshold may be defined according to equation [eq. 1].

$$T(Z_{max}, D, VA) = Z_{max} \frac{2^D \tan\left(\frac{VA}{2}\right)}{1 + 2^D \tan\left(\frac{VA}{2}\right)} \qquad [\text{eq. 1}]$$

Where VA is a value for visual acuity.

iii. Points of the active set of points which have been projected are associated to one newly created patch; a patch comprising data representative of the angular range of a clustered area and the depth range of this area. These points discarded from the set of active points. If the set of active points is empty, the peeling process is completed.

Once the patch data item list has been determined and each point of the point cloud is paired with one patch of the patch data item list. Each patch comprises data corresponding to a space delimited by two portions of concentric spheres centered on the point of view and is characterized by: an angular range $[\theta_{min}, \theta_{max}]$ belonging to $[-\pi; \pi]$ radians and $[\varphi_{min}, \varphi_{max}]$ belonging to $[-\pi/2; \pi/2]$ radians and a depth range $[\rho_{min}, \rho_{max}]$. The used projection method is centered on the point of view. Such a projection method, (e.g. an equirectangular projection) is only angle-dependent: a big object far from the center of projection (i.e. the point of view) may take the same area in the projection map than a small close object. According to the present principles, it is so possible to adapt the patch size according to the importance of the object from the point of view and not according to the intrinsic size of projected object. Such a property is in line with a 3DoF+ context.

FIG. 8 shows a picture comprising image patches encoding depth information of the point cloud of the scene of FIG. 2. In this example, the peeling operation has been performed on the point cloud of the scene of FIG. 2. A list of patches has been determined. The projection of points paired with a patch will generate image patches. Image patches have a resolution called "Atlas Resolution" which defines the quality of the point cloud encoding. For example, an atlas resolution from 18 to 25 pixels per degree allows the encoding of complex scene like the scene of FIG. 2 in a 2048×2048 pixels picture containing a large number of image patches (e.g. 500 or 600 patches). The lower this resolution is, the worse the final quality. To ensure a good alignment of the image patches on the grid of the picture, the projection map resolution may be chosen as an integral divider of the atlas resolution.

A packing operation of image patches is performed. Numerous heuristic algorithms exist to solve the NP-complete problem of packing rectangular cells into a rectangular bin (i.e. the picture to be generated), as the algorithm described in "A Thousand Ways to Pack the Bin" by Jukka Jylanki for instance or the "MaxRects" algorithm (i.e. Single Bin—Best Short Side First configuration) which provides good filling ratio at quite low computational costs. At the end of the packing operation, a location (x, y) of the image patch in the picture (e.g. lower left corner position), and, according to the packing algorithm, a boolean value indicating whether the image patch has been rotated are assigned to each patch of the patch data item list. The packing may be optimized by aligning the patches on Coding Units of the video encoder in order to improve the coding stage. FIG. 8 shows a picture in which are packed image patches of the patch data item list determined for the point cloud of the scene illustrated on FIG. 2. Pixels of the picture of FIG. 8 comprise depth information (i.e. the distance between points of the point cloud and the point of view).

FIG. 9 shows a picture comprising color image patches of the patch data item list determined for the point cloud of the scene illustrated on FIG. 2. In an embodiment, depth and color information are encoded in pixels of a unique picture. In another embodiment, depth and color information are encoded in two pictures.

According to the present principles, a point cloud of the sequence of point clouds is encoded as a picture comprising packed image patches associated with data representative of a patch data item list. The encoding of a point cloud as a picture associated with data has the advantage to be in line with standard compression and transport video pipelines. It is usual, for compression reasons, to gather series of pictures in Group of Pictures (GoP). According to an embodiment of the present encoding method, successive point clouds of the sequence of point clouds to encode are gathered together as a unique point cloud. This grouped point cloud goes through the peeling operation and the packing operation. A unique patch data item list is determined for every point of cloud of the group. The packing structure of the picture is computed for the whole GoP. This structure is preserved during one group of pictures as it notably reduces the video encoding bitrate, especially when the encoder is setup to disable open-gop optimization. Once the packing structure has been determined, each point of the group of point clouds is paired with one patch in the pairing step. Color and depth pictures comprise the results of the splatted projection of each point on image patches. Pictures of the group of pictures and data representative of the patch data item list are encoded in the stream.

FIG. 10 shows an example architecture of a device 10 which may be configured to implement a method described in relation with FIGS. 12 and/or 13. The device 10 may be configured to be an encoder 31, a decoder 33 and/or a renderer 35 of FIG. 3.

The device 10 comprises following elements that are linked together by a data and address bus 101:
- a microprocessor 102 (or CPU), which is, for example, a DSP (or Digital Signal Processor);
- a ROM (or Read Only Memory) 103;
- a RAM (or Random Access Memory) 104;
- a storage interface 105;
- an I/O interface 106 for reception of data to transmit, from an application; and
- a power supply, e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 103 comprises at least a program and parameters. The ROM 103 may store algorithms and instructions to perform techniques in accordance with present principles. When switched on, the CPU 102 uploads the program in the RAM and executes the corresponding instructions.

The RAM 104 comprises, in a register, the program executed by the CPU 102 and uploaded after switch-on of the device 10, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

In accordance with an example of encoding or an encoder 31 of FIG. 3, the sequence of at least one point of cloud 30 is obtained from a source. For example, the source belongs to a set comprising:
- a local memory (103 or 104), e.g. a video memory or a RAM (or Random Access Memory), a flash memory, a ROM (or Read Only Memory), a hard disk;
- a storage interface (105), e.g. an interface with a mass storage, a RAM, a flash memory, a ROM, an optical disc or a magnetic support;
- a communication interface (106), e.g. a wireline interface (for example a bus interface, a wide area network interface, a local area network interface) or a wireless interface (such as a IEEE 802.11 interface or a Bluetooth® interface); and
- a user interface such as a Graphical User Interface enabling a user to input data.

In accordance with examples of the decoding or decoder(s) 33 of FIG. 3, the stream is sent to a destination; specifically, the destination belongs to a set comprising:
- a local memory (103 or 104), e.g. a video memory or a RAM, a flash memory, a hard disk;
- a storage interface (105), e.g. an interface with a mass storage, a RAM, a flash memory, a ROM, an optical disc or a magnetic support; and
- a communication interface (106), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, WiFi® or a Bluetooth® interface).

In accordance with examples of encoding or encoder, a bitstream comprising data representative of the volumetric scene is sent to a destination. As an example, the bitstream is stored in a local or remote memory, e.g. a video memory (104) or a RAM (104), a hard disk (103). In a variant, the bitstream is sent to a storage interface (105), e.g. an interface with a mass storage, a flash memory, ROM, an optical disc or a magnetic support and/or transmitted over a communication interface (106), e.g. an interface to a point to point link, a communication bus, a point to multipoint link or a broadcast network.

In accordance with examples of decoding or decoder or renderer 35 of FIG. 3, the bitstream is obtained from a source. Exemplarily, the bitstream is read from a local memory, e.g. a video memory (104), a RAM (104), a ROM (103), a flash memory (103) or a hard disk (103). In a variant, the bitstream is received from a storage interface (105), e.g. an interface with a mass storage, a RAM, a ROM, a flash memory, an optical disc or a magnetic support and/or received from a communication interface (105), e.g. an interface to a point to point link, a bus, a point to multipoint link or a broadcast network.

In accordance with examples, the device 10 is configured to implement a method described in relation with FIG. 12, and belongs to a set comprising:
- a mobile device;
- a communication device;
- a game device;
- a tablet (or tablet computer);
- a laptop;
- a still picture camera;
- a video camera;
- an encoding chip;
- a server (e.g. a broadcast server, a video-on-demand server or a web server).

In accordance with examples, the device 10 is configured to implement a rendering method described in relation with FIG. 13, and belongs to a set comprising:
- a mobile device;
- a communication device;
- a game device;
- a set top box;
- a TV set;
- a tablet (or tablet computer);
- a laptop; and
- a display (such as a HMD for example).

FIG. 11 shows an example of an embodiment of the syntax of a stream when the data are transmitted over a packet-based transmission protocol. FIG. 11 shows an example structure 1100 of a volumetric video stream. The structure consists in a container which organizes the stream in independent syntax elements. The structure may comprise a header part 1101 which is a set of data common to every syntax elements of the stream. For example, the header part comprises metadata about syntax elements, describing the nature and the role of each of them. The header part may also comprise the coordinates of the point of view used for the encoding and information about the size and the resolution of pictures. The structure comprises a payload comprising syntax elements 1102 and 1103. The first syntax element 1102 comprises data representative of pictures comprising image patches. Pictures may have been compressed according to a video compression method. A picture is associated with a patch data item list of the second syntax element 1103. In an embodiment, the first syntax element comprises a sequence of pairs of pictures, one picture encoding depth information, the paired picture encoding color information. The second syntax element comprises data representative of the patch data item lists associated with pictures of the first syntax element 1102. A patch data item list may be associated with a group of pictures. The data representative of the patch data item lists may comprise, for each patch of each patch data item list, an angular range, a depth range and a description of the shape and location of the corresponding image patch in at least one picture.

For illustration purpose, in the context of ISOBMFF file format standard, color map, depth map and the metadata would typically be referenced in ISOBMFF tracks in a box of type MOOV, with color map and depth map data themselves embedded in media-data box of type mdat.

FIG. 12 illustrates a method for encoding a point cloud in a stream, in a device 10 (described with regard to FIG. 10) configured to be a device 31 of FIG. 3, according to a non-restrictive embodiment of the present principles.

In a step 1200, the different parameters of the device 10 are updated. In particular, the point cloud is obtained from a source, a point of view is determined in the space of the point cloud, a projection method is initialized, sizes and resolutions of the projection map and pictures are determined and an empty patch data item list is created.

A patch data item list determining operation 1201 is performed. This operation is an iterative process comprising steps 1202, 1203 and 1204. In step 1202, points of the point cloud which are visible from the point of view are projection according to the projection method on the projection map. The resolution of the projection map is low (e.g. 1 pixel per degree or 2 pixels per degree) in order to prevent the clustering step 1203 from generating too little patches and thus produce an excessive number of patches. In step 1203, adjacent pixels of the projection map are clustered according depth information. Patches are added to the patch data item list under construction. Projected points are paired with the corresponding patch. In a step 1204 projected points are removed from the point cloud and the operation 1201 is iterated with the modified point cloud. Iterations are performed until the point cloud is empty. In a variant, the operation 1201 is iterated until the patch data item list is full. The patch data item list is considered as full when the area needed for encoding image patches of the patches of the patch data item list is bigger than the area of the bin (i.e. the picture in which image patches will be arranged in operation 1205).

Once the patch data item list is determined, a packing operation 1205 is performed resulting in the generation of the picture. Points of the point cloud are projected in image patches, image patches having the same resolution than the picture. Image patches are arranged in an optimized manner in the picture.

In a step 1206, the picture and associated patch data item list are encoded in the stream according to the syntax described in reference to FIG. 11. The encoding method may be repeated for other point clouds of a sequence of point clouds. In an embodiment of the present principles, a group of point clouds of the sequence, gathered as a unique point cloud, is used as the entry point cloud of the encoding method. A patch data item list common to pictures of the generated group of pictures is determined and encoded once in the stream in association with the whole group of pictures.

FIG. 13 illustrates a method for decoding a point cloud from a stream, in a device 10 (described with regard to FIG. 10) configured to be a device 33 of FIG. 3, according to a non-restrictive embodiment of the present principles.

In a step 1300, the different parameters of the device 10 are updated. In particular, the stream is obtained from a source, a point of view is determined in the space of the point cloud and an un-projection method is initialized. In a variant, the point of view is decoded from the stream.

In a step 1301, a picture and a patch data item list are decoded from the stream. A patch data item list may be associated with a group of pictures. A patch data item comprises an angular range, a depth range and information identifying an area within associated pictures. A picture comprises a set of image patches packed in the pixel grid of the picture. In a step 1302, image patches are unpacked from the picture according to patch data items. The information identifying an area within the picture comprised in each patch data item describes the location and the shape of the image patch in the pixel grid of the picture. This information, the angular range of the patch data item and the picture resolution are used to unpack image patches. A patch data item also comprises a depth range that is used at step 1303. Each unpacked image patch is associated with the corresponding patch data item. In a step 1303, pixels of unpacked images are un-projected according to associated patch data item. The depth information stored in a pixel is decoded according to the depth range allowing an optimal use of the dynamic of the pixel, the depth being encoded for example on 10 bits or 15 bits. The location in space of the decoded point is then computed according to the coordinates of the pixel within the image patch, the angular range and the decoded depth. The direction of the point according to the point of view is, for example, linearly interpolated according to the coordinates of the pixel within the frame of reference of the image patch and the angular range ($[\theta_{min}, \theta_{max}], [\varphi_{min}, \varphi_{max}]$) comprised in the associated patch data item. The point is projected in the determined direction at a distance from the point of view corresponding to the determined depth. If pixels of the picture stores a color value or if a color value is stored in a picture paired with depth picture, this color value is assigned to the projected point.

Naturally, the present disclosure is not limited to the embodiments previously described.

In particular, the present disclosure is not limited to methods and devices for encoding/decoding a stream carrying data representative of a volumetric scene (i.e. a sequence of three-dimension point clouds) but also extends to methods of encoding/decoding a sequence of two-dimension point clouds and to any devices implementing these method and notably any devices comprising at least one CPU and/or at least one GPU.

The present disclosure also relates to a method (and a device configured) for displaying images rendered from the data stream comprising the information representative of the volumetric scene and to a method (and a device configured) for rendering and displaying the object with a flat video.

The present disclosure also relates to a method (and a device configured) for transmitting and/or receiving the stream.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding a point cloud into a stream, the method comprising:
   determining, for a point of view, a list of patch data items by:
   a. projecting a part of the point cloud on a projection map, said part comprising points of the point cloud visible from the point of view;
   b. clustering adjacent pixels of the projection map according to their depth value and for every cluster of pixels, adding to the list of patch data items, a patch data comprising:
      an angle information representative of a frustrum pointing of said point of view and comprising the points projected onto said cluster of pixels,
      a depth information representative of the minimal and maximal depth values of said cluster of pixels;
   c. removing said part of the point cloud from the point cloud;
   d. reiterating a, b and c until the point cloud is empty or the list of patch data items is full,
   generating a picture by, for every patch data item of said list, arranging the cluster of pixels associated with said patch data item onto an area of said picture and adding an area information representative of said area to the patch data item; and
   encoding, in said stream, the picture and the list of patch data items.

2. The method of claim 1, wherein said point cloud comprises points of a group of point clouds of a sequence of point clouds, a patch data item list being determined for a group of pictures, each picture of said group of pictures being generated for a point cloud of said group of point clouds, said encoding comprising encoding, in said stream, the group of pictures and the patch data item list.

3. The method of claim 1, wherein pixels of a cluster of pixels store a depth value, said depth value being determined according to the depth information associated with the cluster of pixels in a patch data item.

4. The method of claim 3, wherein said pixels of a cluster of pixels further store a color value.

5. The method of claim 4, wherein depth values are stored by pixels of a first picture and color values are stored by pixels of a second picture, first and second pictures being paired and encoded into the stream.

6. A device for encoding a point cloud into a stream, the device comprising a memory associated with at least one processor configured to:
   determine, for a point of view, a list of patch data items by:
   a. projecting a part of the point cloud on a projection map, said part comprising points of the point cloud visible from the point of view;
   b. clustering adjacent pixels of the projection map according to their depth value and for every cluster of pixels, adding to the list of patch data items, a patch data item comprising:
      an angle information representative of a frustrum pointing of said point of view and comprising the points projected onto said cluster of pixels,
      a depth information representative of the minimal and maximal depth values of said cluster of pixels;
   c. removing said part of the point cloud from the point cloud;
   d. reiterating a, b and c until the point cloud is empty or the list of patch data items is full,
   generate a picture by, for every patch data item of said list, arranging the cluster of pixels associated with said patch data item onto an area of said picture and adding an area information representative of said area to the patch data item; and
   encode, in said stream, the picture and the list of patch data items.

7. The device of claim 6, wherein said point cloud comprises points of a group of point clouds of a sequence of point clouds, a patch data item list being determined for a group of pictures, each picture of said group of pictures being generated for a point cloud of said group of point clouds, said encoding comprising encoding, in said stream, the group of pictures and the patch data item list.

8. The device of claim 6, wherein pixels of a cluster of pixels store a depth value, said depth value being determined according to the depth information associated with the cluster of pixels in a patch data item.

9. The device of claim 8, wherein said pixels of a cluster of pixels further store a color value.

10. The device of claim 9, wherein depth values are stored by pixels of a first picture and color values are stored by pixels of a second picture, first and second pictures being paired and encoded into the stream.

11. A method of decoding a point cloud from a stream, the method comprising:
- decoding a picture and a patch data item list from the stream, a patch data item comprising:
  - an area information describing a cluster of pixels in said picture;
  - an angle information representative of a frustrum pointing of a point of view and comprising the points projected onto said cluster of pixels;
  - a depth information representative of the minimal and maximal depth values of said cluster of pixels;
- for a patch data item of said list:
  - un-projecting pixels of the cluster of pixels according to the point of view, to the angle information and to the depth information.

12. The method of claim 11, wherein said point of view is obtained from the stream.

13. A device for decoding a point cloud from a stream, the device comprising a memory associated with at least a processor configured to:
- decode a picture and a patch data item list from the stream, a patch data item comprising:
  - an area information describing a cluster of pixels in said picture;
  - an angle information representative of a frustrum pointing of a point of view and comprising the points projected onto said cluster of pixels;
  - a depth information representative of the minimal and maximal depth values of said cluster of pixels;
- for a patch data item of said list:
  - un-projecting pixels of the cluster of pixels according to the point of view, to the angular information, and to the depth information.

14. The device of claim 13 wherein said point of view is obtained from the stream.

* * * * *